United States Patent
Compton

(10) Patent No.: US 12,126,650 B2
(45) Date of Patent: Oct. 22, 2024

(54) DETECTION AND REMEDIATION OF MALICIOUS NETWORK TRAFFIC USING TARPITTING

(71) Applicant: Charter Communications Operating, LLC, St. Louis, MO (US)

(72) Inventor: Richard A. Compton, Highlands Ranch, CO (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 1029 days.

(21) Appl. No.: 16/702,494

(22) Filed: Dec. 3, 2019

(65) Prior Publication Data

US 2021/0168173 A1    Jun. 3, 2021

(51) Int. Cl.
  *H04L 9/40* (2022.01)
  *H04L 47/193* (2022.01)
  *H04L 69/163* (2022.01)

(52) U.S. Cl.
  CPC ........ *H04L 63/1491* (2013.01); *H04L 47/193* (2013.01); *H04L 63/1416* (2013.01); *H04L 69/163* (2013.01)

(58) Field of Classification Search
  CPC ............... H04L 63/1491; H04L 47/193; H04L 63/1416; H04L 69/163; H04L 63/1425; H04L 63/1458; H04L 63/1466; H04L 63/145
  See application file for complete search history.

(56) References Cited

U.S. PATENT DOCUMENTS

| | | | |
|---|---|---|---|
| 7,792,963 B2 | 9/2010 | Gould | |
| 7,836,496 B2* | 11/2010 | Chesla | H04L 63/1416 726/13 |
| 2001/0049731 A1* | 12/2001 | Kuusinen | H04W 28/10 707/999.002 |
| 2003/0056217 A1 | 3/2003 | Brooks | |
| 2005/0021740 A1* | 1/2005 | Bar | H04L 63/145 709/224 |
| 2006/0130107 A1 | 6/2006 | Gonder et al. | |
| 2007/0079378 A1* | 4/2007 | Itoh | H04L 63/145 726/24 |
| 2007/0217436 A1 | 9/2007 | Markley | |
| 2009/0248794 A1 | 10/2009 | Helms | |

(Continued)

OTHER PUBLICATIONS

Wikimedia Foundation. (Date: Nov. 7, 2019). Tarpit (networking). Wikipedia. Retrieved May 2, 2022 via Wayback Machine entry for https://en.wikipedia.org/wiki/Tarpit_(networking).

(Continued)

*Primary Examiner* — Aftab N. Khan
(74) *Attorney, Agent, or Firm* — Otterstedt & Kammer PLLC

(57) ABSTRACT

Apparatus, systems, and methods for the detection and remediation of malicious network traffic. Network traffic is received from a network-based device and analyzed the network traffic to identify the network-based device as an infected network-based device. In response to identifying the network-based device as an infected network-based device, a response message is sent to the infected network-based device, the response message triggering a tarpitting effect on the network-based device.

17 Claims, 13 Drawing Sheets

(56) References Cited

U.S. PATENT DOCUMENTS

2010/0071051 A1* 3/2010 Choyi .................. H04L 63/145
                                                    726/12
2010/0313236 A1   12/2010 Straub
2016/0294858 A1* 10/2016 Woolward ............. H04L 63/20
2017/0223049 A1*  8/2017 Kuperman .......... H04L 63/0281
2020/0244699 A1*  7/2020 Hutchinson ......... H04L 63/1433

OTHER PUBLICATIONS

Wikimedia Foundation. (Date: Nov. 28, 2019). Iptables. Wikipedia. Retrieved May 2, 2022 via Wayback Machine entry for https://en.wikipedia.org/wiki/Iptables.
Tom Liston talks about LaBrea. LaBrea. (Date: May 27, 2019). Retrieved May 2, 2022 via Wayback Machine entry forhttp://labrea.sourceforge.net/Intro-History.html.

* cited by examiner

DETECTION AND REMEDIATION OF MALICIOUS NETWORK TRAFFIC USING TARPITTING

FIELD OF THE INVENTION

The present invention relates generally to the electrical, electronic and computer arts, and, more particularly, to the detection and remediation of malicious network traffic.

BACKGROUND OF THE INVENTION

In the context of computing, a malware attack is an attempt to distribute and infect a device with software containing a computer virus, such as a worm or Trojan horse, or to otherwise take malicious control of a device, such as by exploiting a vulnerability in an application installed on the target device. The malware may be distributed from an originating source or from a host infected with the malware. Malware known as spyware attempts to access and potentially distribute user data. Malware known as ransomware may prevent an otherwise authorized user from accessing computer data, computer computational resources, or both. In some cases, the malware intentionally destroys computer data. Antivirus software, firewalls, and the like are conventionally used to prevent the dissemination of malware, and to detect and remove malware from infected computers.

SUMMARY OF THE INVENTION

Principles of the invention provide detection and remediation of malicious network traffic using tar pitting. In one aspect, an exemplary method includes the operations of receiving network traffic from a network-based device; analyzing the network traffic to identify the network-based device as an infected network-based device; and sending, in response to identifying the network-based device as an infected network-based device, a response message to the infected network-based device, the response message triggering a tarpitting effect on the network-based device.

In one aspect, a non-transitory computer readable medium comprises computer executable instructions which when executed by a computer cause the computer to perform the method of: receiving network traffic from a network-based device; analyzing the network traffic to identify the network-based device as an infected network-based device; and sending, in response to identifying the network-based device as an infected network-based device, a response message to the infected network-based device, the response message triggering a tarpitting effect on the network-based device.

In one aspect, an apparatus comprises a memory; and at least one processor, coupled to said memory, and operative to perform operations comprising: receiving network traffic from a network-based device; analyzing the network traffic to identify the network-based device as an infected network-based device; and sending, in response to identifying the network-based device as an infected network-based device, a response message to the infected network-based device, the response message triggering a tarpitting effect on the network-based device.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., a DDoS honeypot, an Internet Service Provider (ISP) peering router, data center, DDoS mitigation device, and the like) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:
- tarpitting of malicious network traffic from network-based devices;
- detection and remediation for a malware distribution attack;
- implementation of novel detection and mitigation techniques that can be easily integrated with existing system hardware, thereby providing a more robust detection and mitigation mechanism without significantly increasing system overhead and complexity; and
- enable other uninfected devices to communicate on a network without interference from the malicious traffic.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Principles of the present disclosure will be described herein in the context of apparatus and methods for detecting and mitigating malware attacks in a networked computing environment. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

Figure 1:
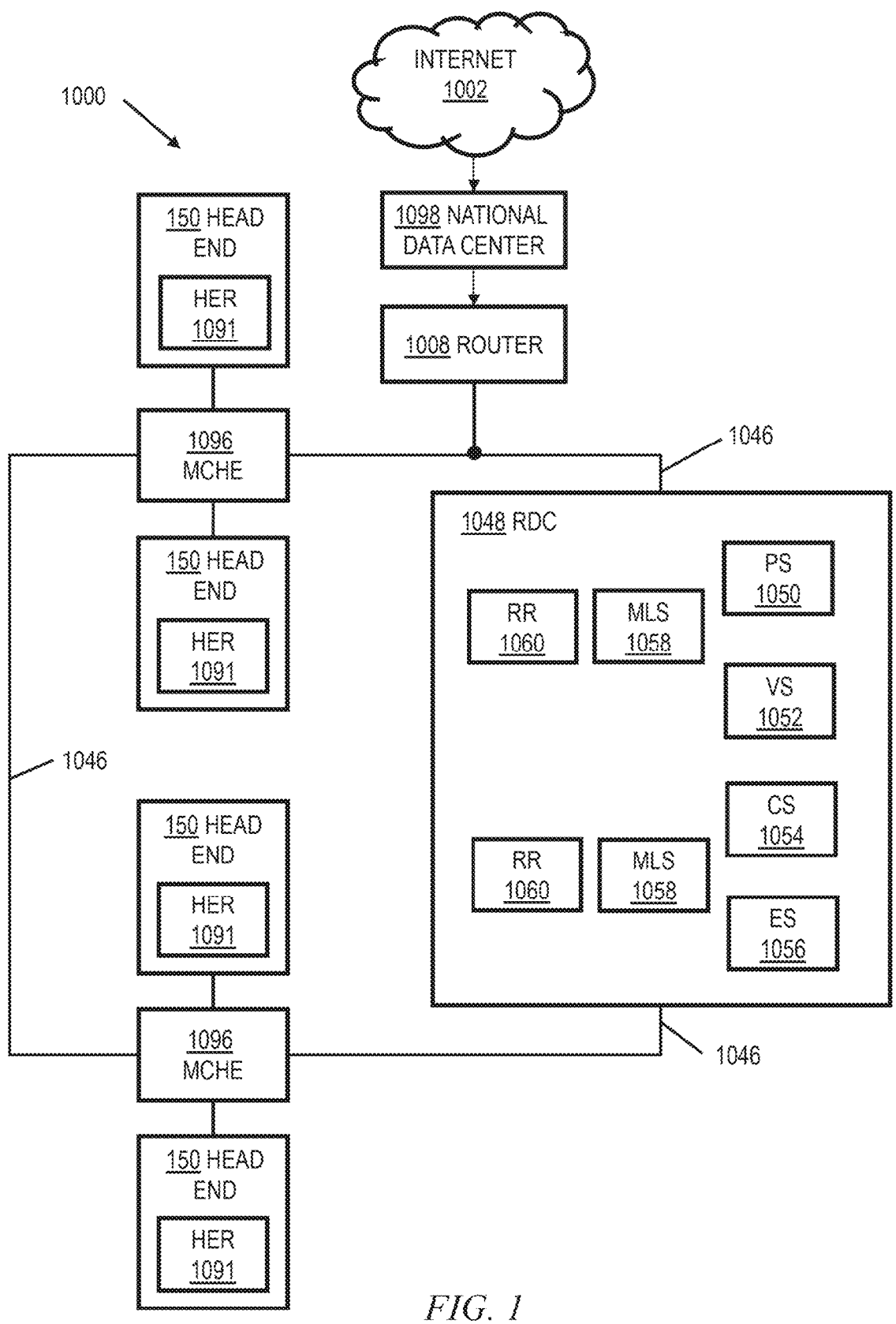
FIG. 1 is a block diagram of an exemplary embodiment of a system, within which one or more aspects of the invention can be implemented.

IP-based data services may be provided over a variety of networks. Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area. In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, California, USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
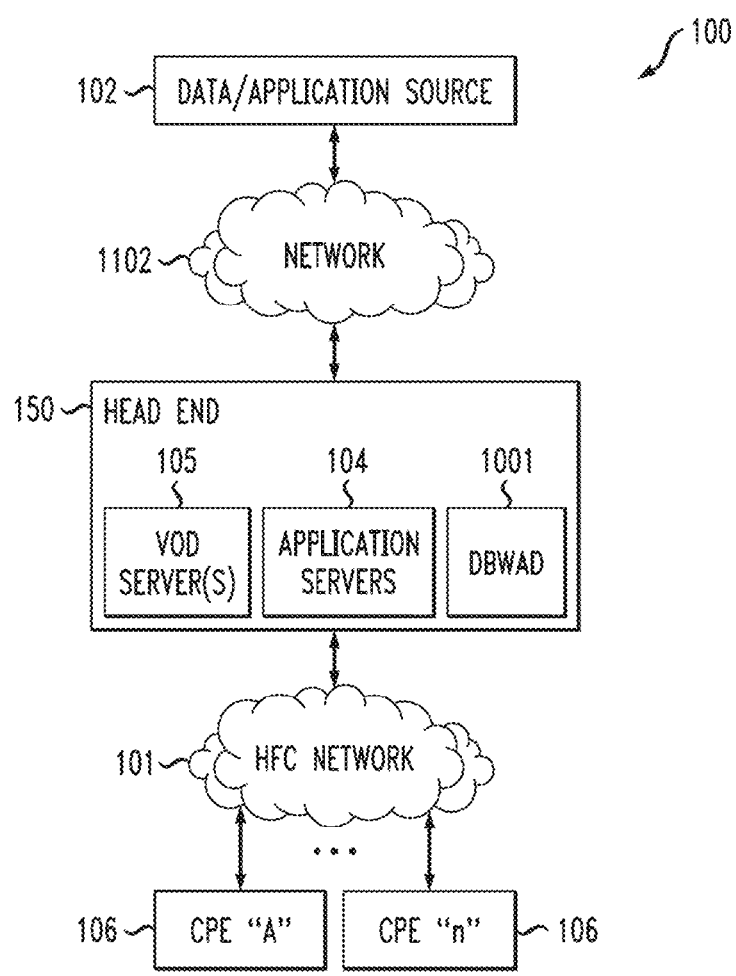
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ S-ONUs as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g. FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
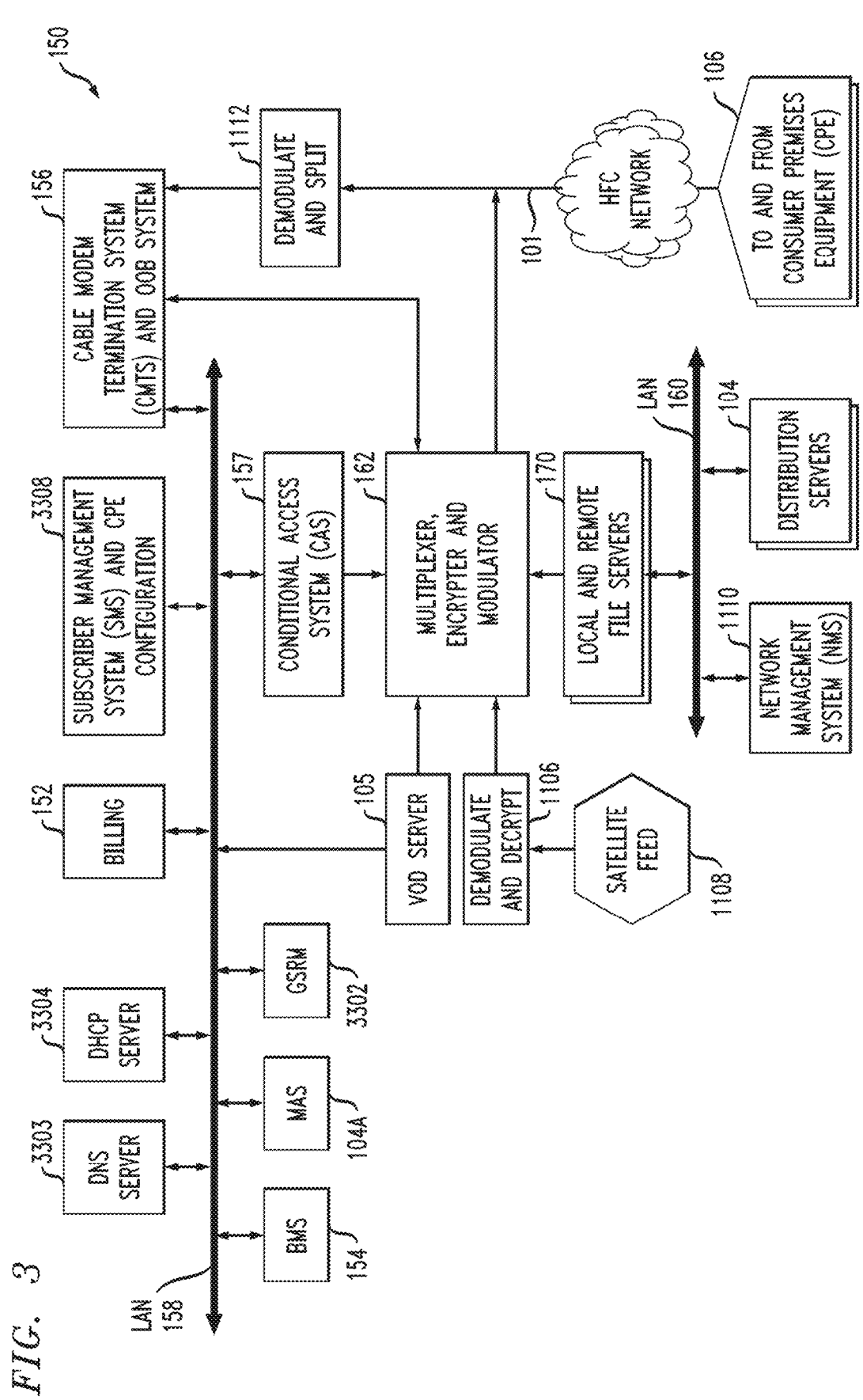
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multi-plexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville CO 80027, USA) and associated protocols (e.g., DOCSIS 1.x, 2.0, 3.0, or 3.1). The OpenCable™ Application Platform (OCAP) 1.0, 1.3.1, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application context for one or more embodiments. However, one or more embodiments are generally applicable to IP transport of data, regardless of what kind of functionality is employed. It is also worth noting that the use of DOCSIS Provisioning of EPON (Ethernet over Passive Optical Network) or "DPoE" (Specifications available from CableLabs, Louisville, CO, USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

Figure 4:
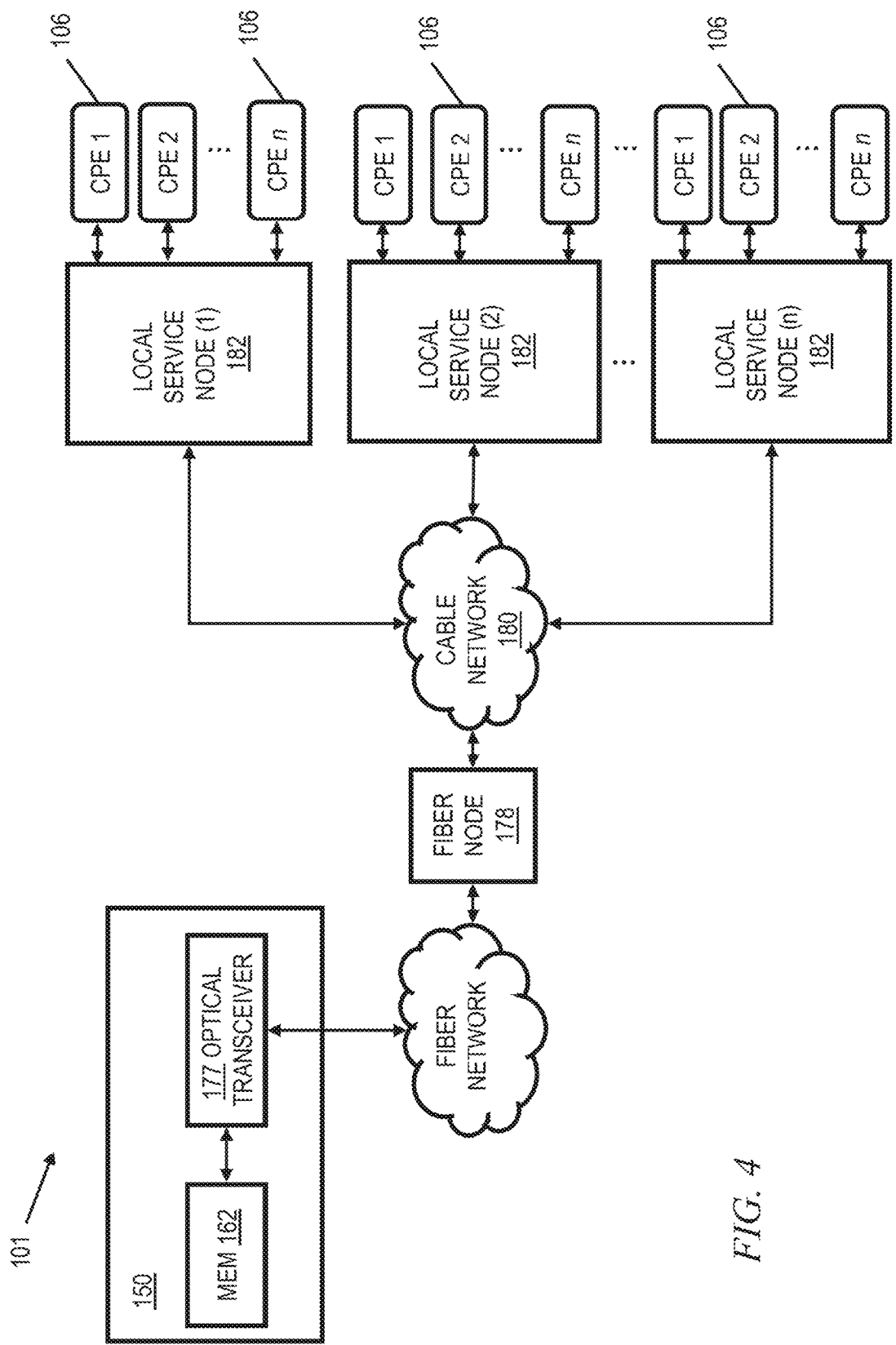
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed for completeness, it being understood that embodiments of the invention have broad applicability to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
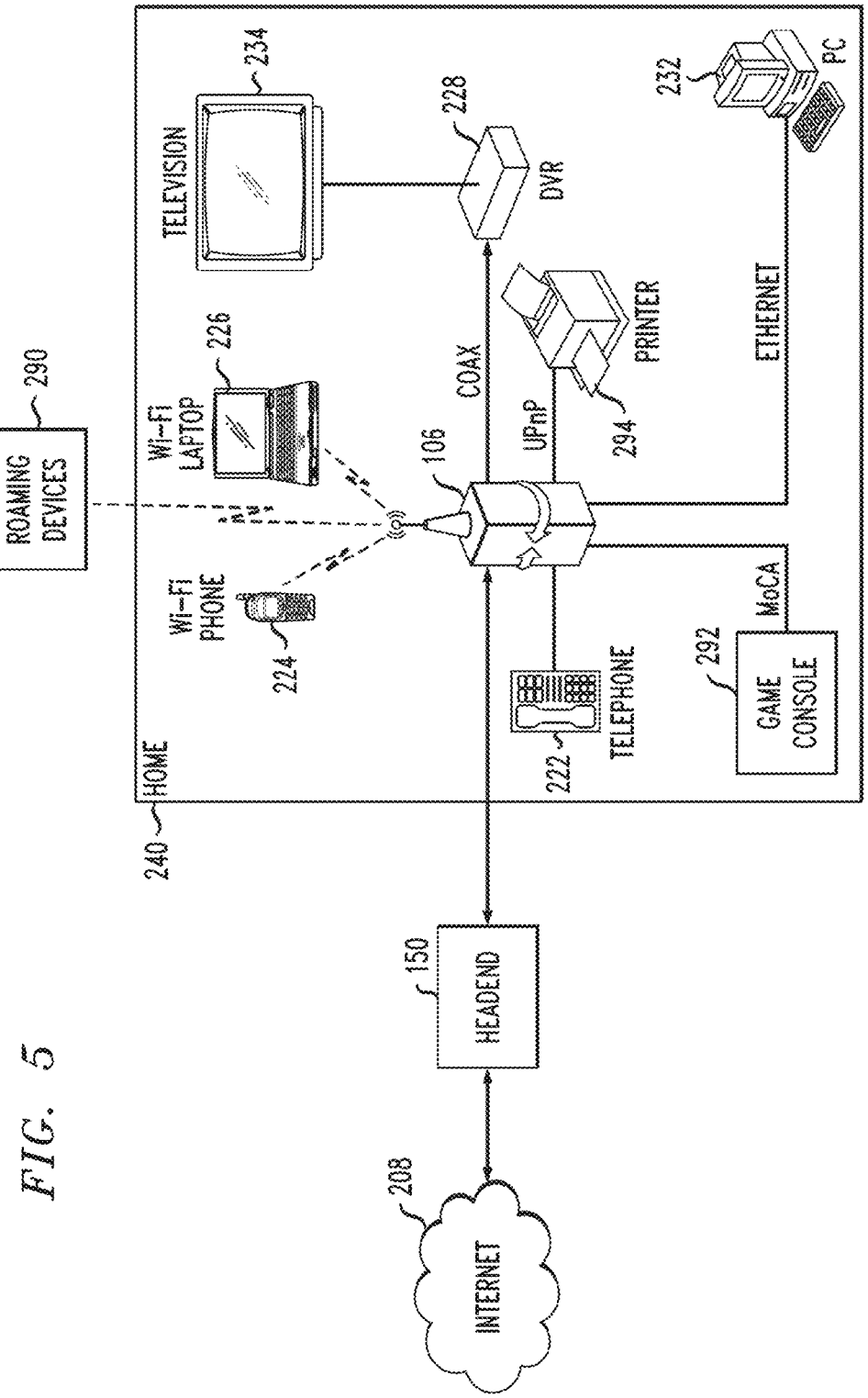
FIG. 5 is a functional block diagram of a premises network, including an exemplary centralized customer premises equipment (CPE) unit, interfacing with a head end such as that of FIG. 3.
Figure 6:
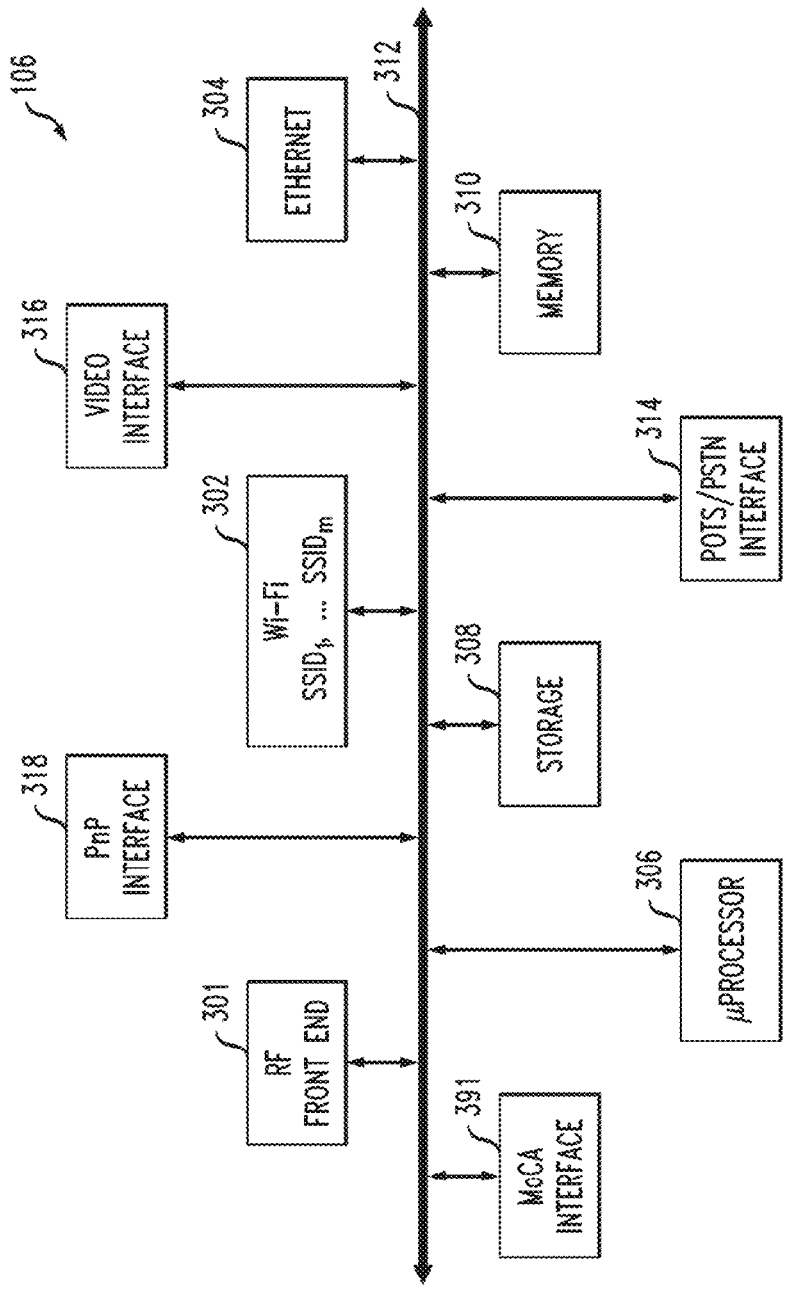
FIG. 6 is a functional block diagram of an exemplary centralized CPE unit, useful within the system of FIG. 1.
Figure 7:
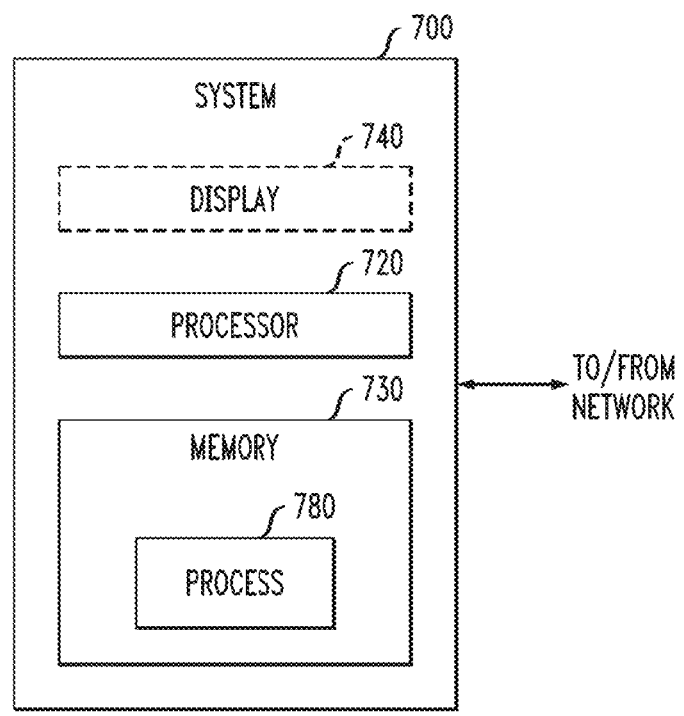
FIG. 7 is a block diagram of a computer system useful in connection with one or more aspects of the invention.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
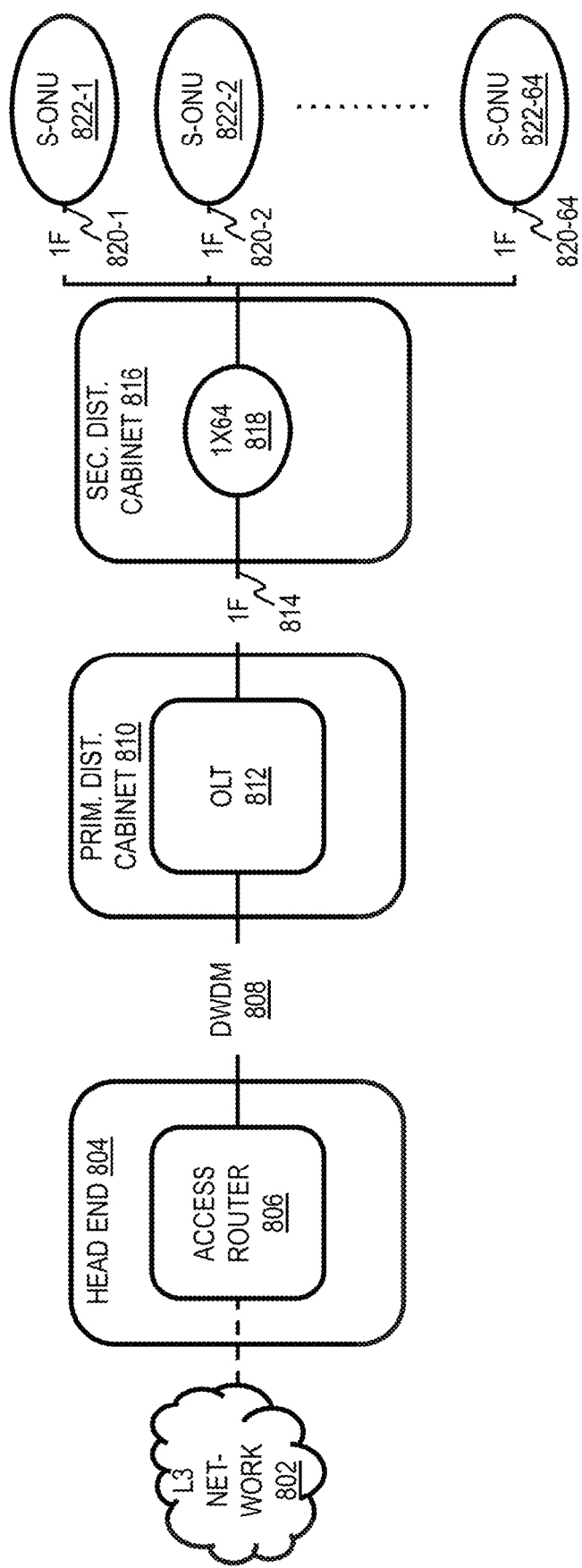
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1 through 820-64, it being understood that a different ratio splitter could be used in other embodiments and/or that not all of the 64 (or other number of) outlet ports are necessarily connected to an S-ONU.

Figure 9:
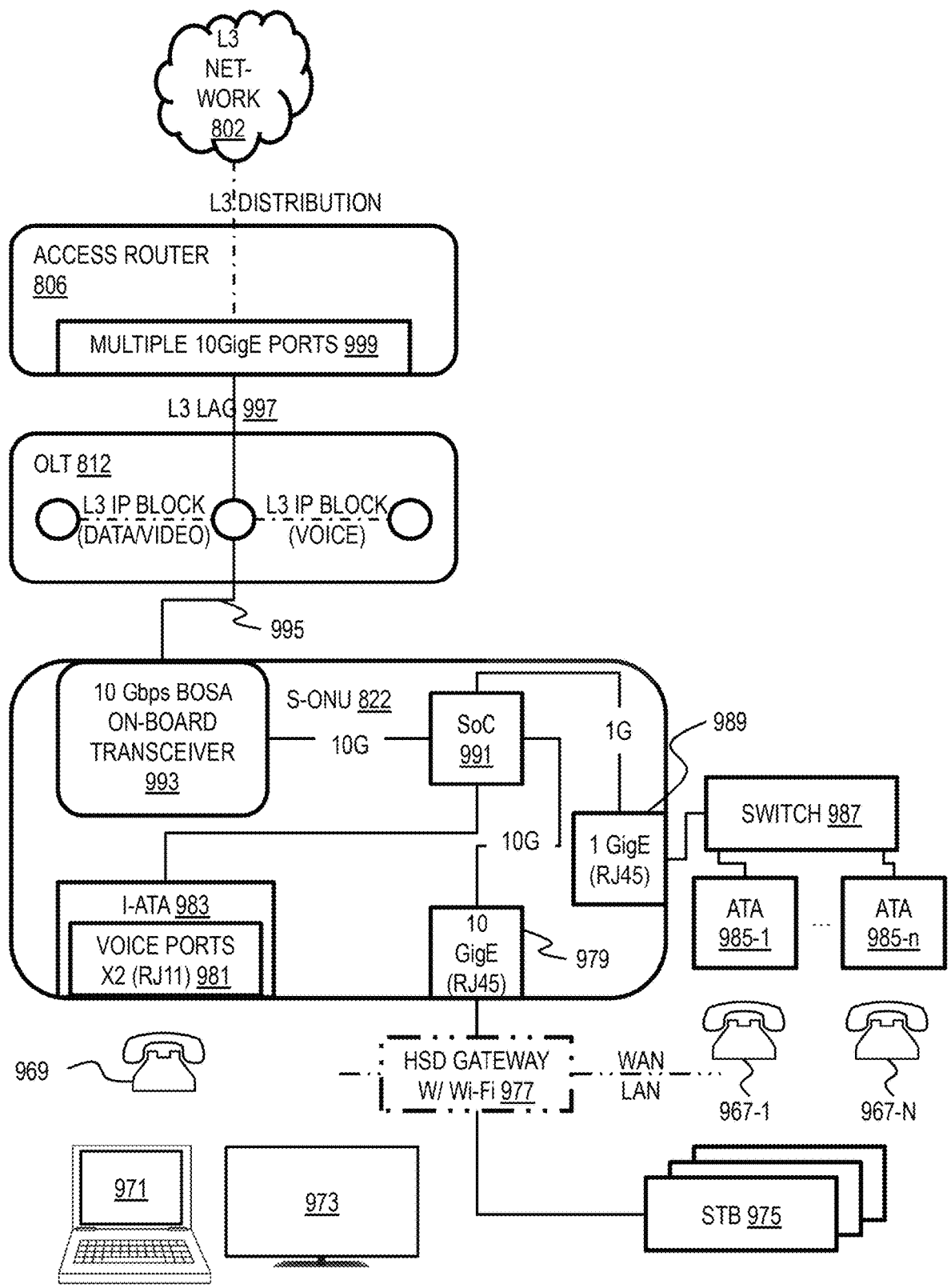
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical subassembly (BOSA) on-board transceiver 993 with a 10G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through 967-n, suitable for the needs of the business, via external analog telephone adapters (ATAs) 985-1 through 985-n. The parameter "n" in FIG. 9 is not necessarily the same as the parameter "n" in other figures, but rather generally represents a desired number of units. Connection 995 can be, for example, via SMF (single-mode optical fiber).

In addition to "broadcast" content (e.g., video programming), the systems of FIGS. 1-6, 8, and 9 also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

One or more embodiments provide a method of detecting and mitigating a malware attack. In one example embodiment, a malware attack by an infected network-based device that is generating malicious network traffic is mitigated by generating and submitting tarpitting response messages to the infected device. For example, response messages which spoof the source IP address of the intended destination (of the attack) and that prescribe a window size of zero may be sent to the infected device, thereby temporarily halting the transmission of packets that are part of the malware attack. The response messages are generated, for example, by the default gateway of the infected device. By setting the TCP window size to zero on the spoofed replies, the infected host will react as if it has made a connection to a valid open port on the server but will assume that the server is just temporarily busy. The infected host will wait for a certain amount of time and then attempt to send another malicious packet. The tarpit generated by the default gateway or other device will respond again with another response packet with the TCP window size set to zero which will again cause the infected host to wait before attempting to transmit more malicious packets. This causes the infected host to vastly slow down its rate of transmission and thus frees up the network resources to be used for valid connections by other hosts on the network.

Figure 10:
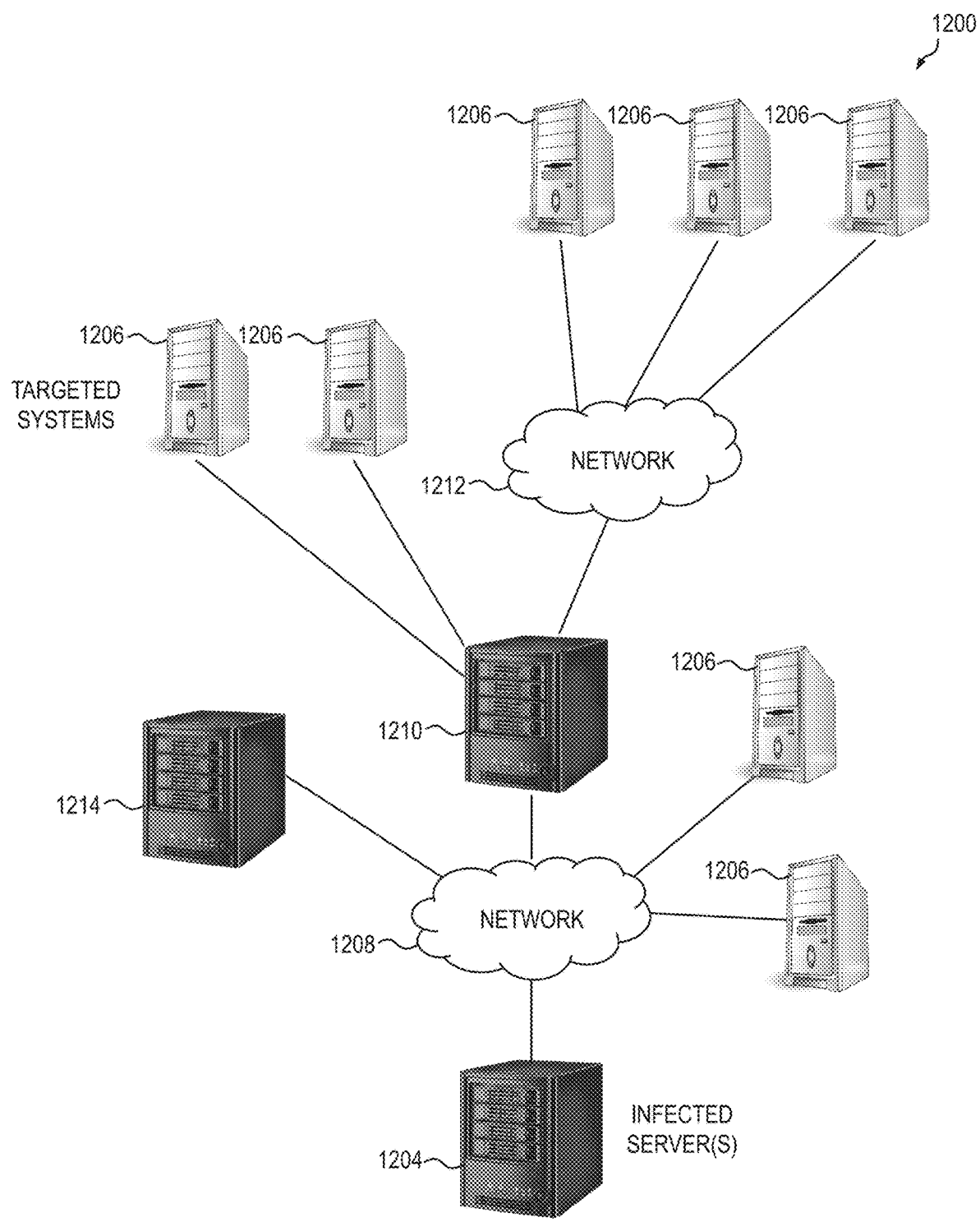
FIG. 10 is a block diagram conceptually depicting the occurrence of a malware distribution attack in an example networked computing system.

FIG. 10 is a block diagram conceptually depicting the occurrence of a malware distribution attack in an example networked computing system 1200. In a typical malware distribution attack, an infected server(s) 1204 attempts to deliver malware to one or more of the servers 1206. The malicious network traffic may be distributed via network 1208 and/or the Internet 1212. In one example embodiment, the network traffic traverses an intelligent CPE 1210. The intelligent CPE 1210 analyzes the network traffic and determines whether the network traffic is part of a malware attack and/or generates metadata describing the network traffic. The metadata is sent to a central controller 1214 that analyzes the metadata to determine if the network traffic is part of a malware attack. The central controller 1214 may be a stand-alone network-based device, or may be incorporated into the intelligent CPE 1210 or other network-based device. If the network traffic is determined to be part of a malware attack, the intelligent CPE 1210 and/or the central controller 1214 generates response messages, as described above. In one example embodiment, additional remediation actions are performed, as described below in conjunction with FIGS. 11 and 12.

The terms "network traffic," or "data traffic," or simply "traffic" as used herein are intended to broadly refer to the amount of data moving across a network at a given point in time. From a computing standpoint, network data in computer networks is most typically encapsulated in data packets, which provide the load in the network.

Currently, detection of malware attacks is based, for example, on the volume of traffic. For example, a standard detection scheme may involve inspecting the volume of data packets sent to a certain customer from all sources under "normal" conditions to establish a baseline traffic level, and if there is a large increase in the volume of traffic compared to the established baseline level, a malware attack is suspected. Various parameters may be used to determine whether a threshold level of traffic has been exceeded, such as, but not limited to, evaluating total Transmission Control Protocol (TCP) traffic, total Domain Name System (DNS) traffic, various protocols commonly used for worm propagation, and the like.

When the volume of detected traffic exceeds some threshold, either a prescribed value or based on one or more algorithms or software, some action is taken which may be in the form of, for instance, triggering an alert or blocking what is believed to be the attacking traffic. Current attack mitigation may involve, for example, broad packet-filtering, throttling or rate-limiting the traffic to alleviate what is presumed to be an attack, when in reality the traffic may be attributable to valid users. Embodiments of the invention, according to aspects thereof, beneficially provide apparatus and/or methods for detecting and mitigating the threat of malware distribution attacks by using, at least in part, a tarpitting mechanism to stop or slow the transmission of malicious network traffic. The detection may include the techniques described above.

In one or more embodiments, the tarpitting mechanism is used in conjunction with at least one other criteria, such as, for example, the above described volume of traffic detection technique. In one example embodiment, the detection can be performed by a network element other than the CPE 106, such as a device upstream relative to the CPE 106 (including intrusion prevention systems), a device that analyzes the netflow records generated by upstream routers, and the like.

Returning to FIG. 5, the CPE 106 (could encompass intelligent CPE 1210) receives and analyzes the network traffic using, for example, one or more detection rules and makes a decision as to whether the traffic is malicious and part of an attack. In one example embodiment, a particular pattern of traffic, such as a spike in traffic, a continuous stream of traffic (such as a continuous stream of DNS queries), and the like is assumed to be a malicious attack. In one example embodiment, other devices, such as antivirus devices (or software), central controllers, routers, and the like, may also detect the presence of an attack and identify the malicious network traffic and/or source of the malicious network traffic. If an attack is determined to be underway, the CPE 106/1210 or other device obtains the IP address of the victim that is being targeted by the attack traffic and triggers one or more actions to mitigate the attack traffic. In one example embodiment, a mitigation action specifies the generation of response messages to the source of the malicious traffic where the response messages effectively tarpit the source of the attack, that is, that stop or slow the transmission of malicious network traffic at the source.

In detecting the presence of a potential attack, the CPE 106/1210 is configured, for example, to monitor the volume of packets received from an attacker such as infected server 1204. As described above, any large volume of network traffic, a particular pattern of network traffic, and the like may be used to identify an attack. In the former case, the CPE 106/1210 may utilize one or more thresholds, which may be stored either internally or may reside externally to the CPE 106/1210. The thresholds may be based on a prescribed value, on one or more algorithms or software (e.g., modeling a behavior and/or operational status of the network), or some combination thereof, according to one or more embodiments; the thresholds may be fixed or dynamic. Various parameters may be used to determine whether a threshold level of traffic has been exceeded, including, but not limited to, evaluating total TCP traffic, total DNS traffic, various protocols commonly used for DDoS attacks, and the like.

In one example embodiment, the decision of whether a submission is treated as an attack is based on a received traffic volume originating from a potentially malicious source (such as a spike in traffic volume) and prescribed threat information. The threat information preferably comprises a risk level or weighting of risk. This weighting is used to determine a probability that the incoming traffic is originating from a malicious IP source. In one or more embodiments, the threat information may be in the form of a whitelist of valid ASNs, a blacklist of malicious ASNs, and the like. Preferably, the threat information is updated periodically, for example, automatically based on historical data or manually by a user, so that the threat information is kept current to adapt to changing threats. It is to be appreciated that embodiments of the invention are not limited to any specific form(s) of the threat information in evaluating whether the spike in traffic flow is attributable to a malicious IP source.

Figure 11:
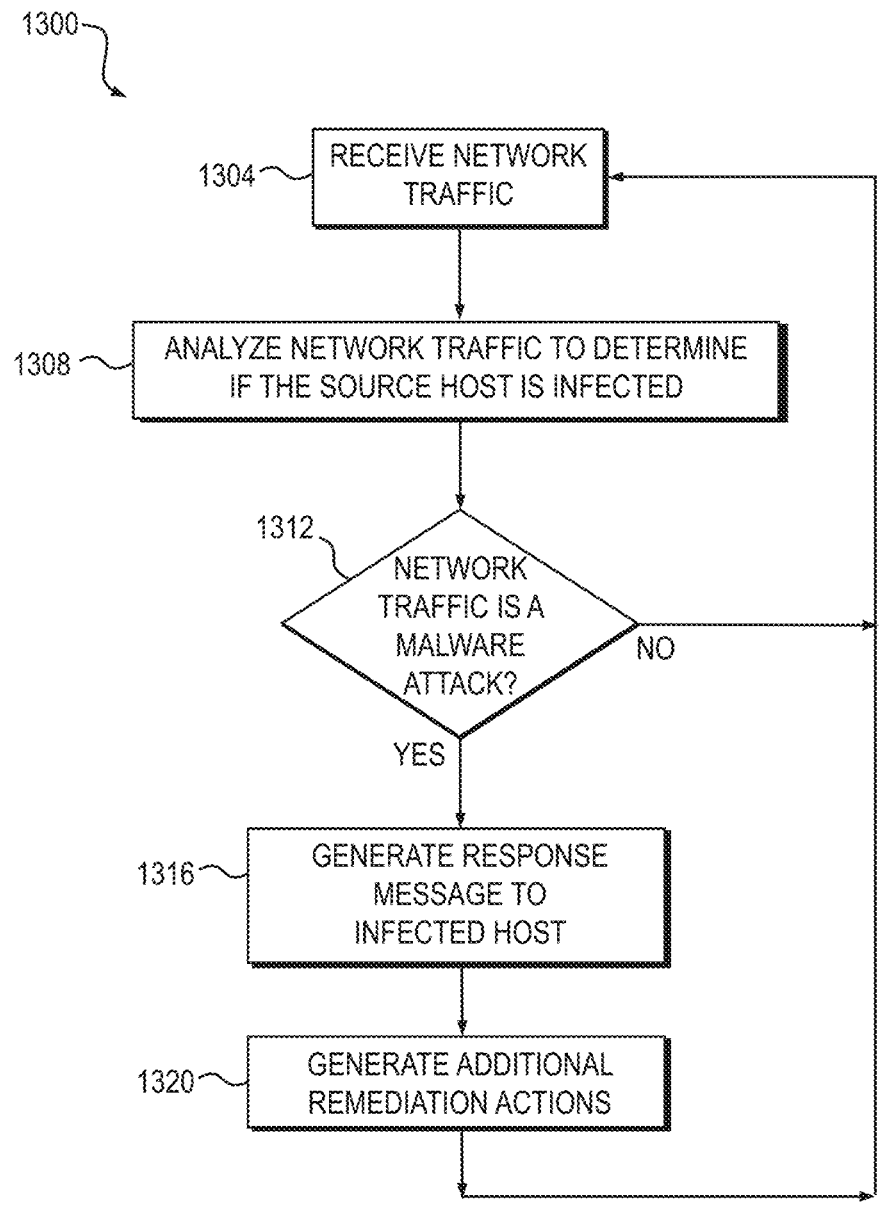
FIG. 11 is a flow diagram depicting a first example method for detecting and mitigating malware distribution attacks, in accordance with an example embodiment.

FIG. 11 is a flow diagram depicting a first example method 1300 for detecting and mitigating malware distribution attacks, in accordance with an example embodiment. In one example embodiment, at least a portion of the detection and mitigation flow of the method 1300 is preferably implemented in the CPE 106/1210. In one example embodiment, at least a portion of the detection and mitigation flow of the method 1300 is preferably implemented in a central controller 1214. The central controller 1214 may reside on a host or network device connected to the network 1208 and/or the Internet 1212.

With continued reference to FIG. 11, in accordance with the method 1300, the CPE 106/1210 receives network traffic from a local device, such as the wired telephony unit 222, the Wi-Fi or other wireless-enabled phone 224, the Wi-Fi or other wireless-enabled laptop 226, the DVR 228, the PC 232, the printer 294, the game console 292, the roaming devices 290, and the like (operation 1304).

The received network traffic is analyzed to determine if the network traffic is an attempt to distribute malware and/or if the source of the network traffic is an infected device (operation 1308). In one example embodiment, the CPE 106/1210 determines if the network traffic triggers a static signature/threshold (such as the number of outgoing connections exceeds a threshold x) or dynamically observes network traffic anomalies (such as traffic rate and/or network connections that are above what has previously been observed for a corresponding time period). In one example embodiment, the CPE 106/1210 receives a report from an antivirus entity indicating that the network traffic is malicious, such as indicating that the network traffic contains a "worm."

In one example embodiment, the network traffic is a suspected attack (YES branch of decision block 1312) if a report from an antivirus entity indicates that the network traffic is malicious, if a rate of the network traffic exceeds a predefined threshold, such as an established baseline normal traffic level of, for example, 5 packets per second, and the like. This threshold information, or a portion thereof, may be obtained from a source such as an external database, a software module running a dynamic threshold calculation application, and the like. The volume of traffic may be compared with threshold information (such as, using a comparator or other comparison mechanism) to determine whether or not the volume of traffic flow exceeds the defined threshold. When the network traffic does not satisfy a rule indicating that an attack is underway (NO branch of decision block 1312), the CPE 106/1210 determines that the network traffic is not a suspected attack and the method 1300 continues with step 1304. When the network traffic satisfies a rule indicating that an attack is underway (YES branch of decision block 1312), the CPE 106/1210 determines that the network traffic is a suspected attack and the method 1300 proceeds with operation 1316. Given the teachings herein, the skilled artisan will be able to select a suitable threshold based on the application.

If the received network traffic is determined to be non-malicious traffic (as determined at decision block 1312), operation 1304 is repeated, either immediately or after a time delay (such as after 100 ms). If the received network traffic is determined to be malicious traffic (as determined at decision block 1312), a suitable response message is generated and sent to the infected device in order to stop or slow the transmission of malicious network traffic (operation 1316). The response message may be a "spoofed" response message in the sense that it has the effect of "tar pitting" the infected local device, that is, stopping, slowing down and/or restricting the transmission of the malicious network traffic by the infected device. For example, the "spoofed" response message may set the window size to zero (or a value close to zero) which will have the effect of reducing the amount of malicious network traffic. In another example, a client's SYN packet is replied to with a spoofed SYN/ACK packet. Any time the infected device attempts to transmit a packet after the TCP connection is open, a spoofed packet will be sent to the infected device with the window size set to zero or close to zero.

The "spoofed" response message can potentially be generated by any device that is not prevented from sending spoofed traffic. For example, the CPE 106/1210, the central controller 1214, or another device that acts as a default gateway router used by the infected device to connect outside of its LAN may generate the "spoofed" response message.

In one example embodiment, other remediation actions are implemented in addition to the tarpitting described above (operation 1320). For example, the infected device may be prevented from communicating with other devices, such as other hosts. In this case, certain whitelisted IPs/domains may be exempted and may be allowed to communicate with the infected device. For example, an infected Windows box would be segregated so that it cannot communicate with any hosts except antivirus servers, update servers, and the like thereby allowing the infected host to be remediated.

Such remediation actions may also comprise, for example, discarding packets from the flagged source address, rate-limiting the traffic, diverting traffic flow to a specified network address, performing DPI or another analysis mechanism on all or a subset of the packets constituting the malicious traffic flow, and the like. For example, the CPE 106/1210 may send a message or other control signal to a network device instructing the network device to handle all traffic from a specified network address differently from the normal network traffic. Prescribed mitigation actions may be stored in a database, table, whitelist, and the like. In this manner, the mitigation action performed can be tailored, for example, to the corresponding source address.

In one example embodiment, when a cessation of the malicious attack is detected by the CPE 106/1210, the central controller 1214, or other network device, the appropriate network devices are directed to undo the mitigation action(s), such as to remove the block of the attack network traffic, to resume the generation of non-spoofed response messages, and the like. For example, if the malware is removed from the infected device, the generation of the spoofed response messages will be halted.

Figure 12:
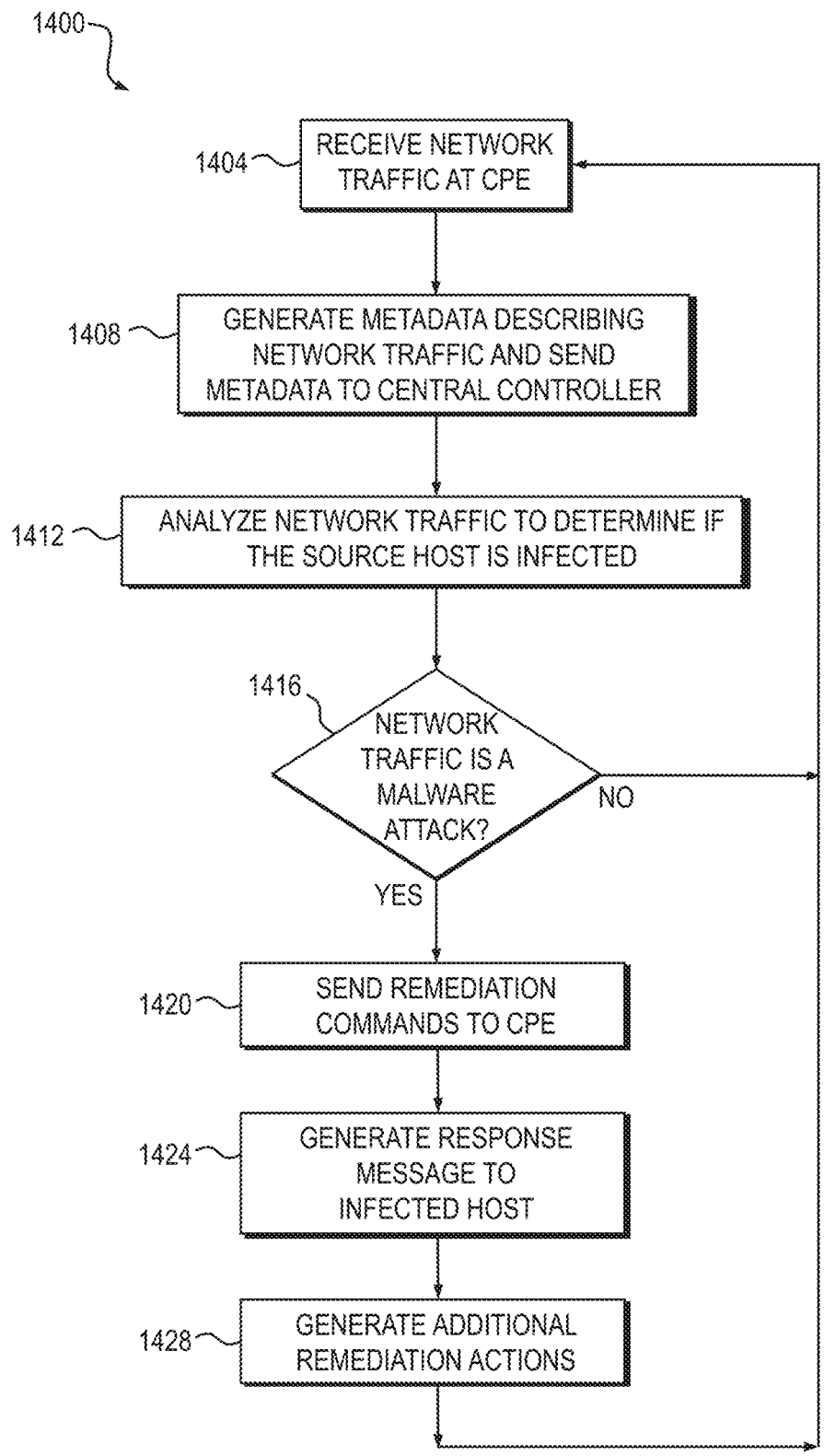
FIG. 12 is a flow diagram depicting a second example method for detecting and mitigating malware distribution attacks, in accordance with an example embodiment.

FIG. 12 is a flow diagram depicting a second example method 1400 for detecting and mitigating malware distribution attacks, in accordance with an example embodiment. In one example embodiment, at least a portion of the detection and mitigation flow of the method 1400 is implemented in the CPE 106/1210 and at least a portion of the detection and mitigation flow of the method 1400 is implemented in the central controller 1214. The central controller 1214 may reside on a host or network device connected to the network 1208 and/or the Internet 1212.

With continued reference to FIG. 12, in accordance with the method 1400, the CPE 106/1210 receives network traffic from a local device, such as the wired telephony unit 222, the Wi-Fi or other wireless-enabled phone 224, the Wi-Fi or other wireless-enabled laptop 226, the DVR 228, the PC 232, the printer 294, the game console 292, the roaming devices 290, and the like (operation 1404).

The received network traffic is analyzed and metadata describing the network traffic, such information related to the source and type of network traffic, is generated and sent to the central controller 1214 (operation 1408). In one example embodiment, the CPE 106/1210 determines if the network traffic triggers a static signature/threshold (such as the number of outgoing connections exceeds a threshold x) or dynamically observes network traffic anomalies (such as traffic rate and/or network connections that are above what has previously been observed for a corresponding time period).

In one example embodiment, the metadata is analyzed to determine if the network traffic is an attempt to distribute malware and/or if the source of the network traffic is an infected device (operation 1412). In one example embodiment, the central controller 1214 receives a report from an antivirus entity indicating that the network traffic is malicious, such as, the network traffic contains a "worm."

In one example embodiment, the network traffic is a suspected attack (YES branch of decision block 1416) if a report from an antivirus entity indicates that the network traffic is malicious, if a rate of the network traffic exceeds a predefined threshold, such as an established baseline normal traffic level of, for example, 5 packets per second, and the like. This threshold information, or a portion thereof, may be obtained from a source such as an external database, a software module running a dynamic threshold calculation application, and the like. The volume of traffic may be compared with threshold information (such as, using a comparator or other comparison mechanism) to determine whether or not the volume of traffic flow exceeds the defined threshold. When the network traffic does not satisfy a rule indicating that an attack is underway (NO branch of decision block 1416), the central controller 1214 determines that the network traffic is not a suspected attack and the method 1400 continues with step 1404. When the network traffic satisfies a rule indicating that an attack is underway (YES branch of decision block 1416), the method 1400 proceeds with operation 1420. Given the teachings herein, the skilled artisan will be able to select a suitable threshold based on the application.

If the received network traffic is determined to be non-malicious traffic (as determined at decision block 1416), operation 1404 is repeated, either immediately or after a time delay (such as after 100 ms). If the received network traffic is determined to be malicious traffic (as determined at decision block 1416), a remediation command is sent by the central controller 1214 to the CPE 106/1210 identifying the network traffic and the source of the network traffic that is malicious (operation 1420).

A suitable response message is generated and sent to the infected device in order to stop or slow the transmission of malicious network traffic (operation 1424). The response message may be a "spoofed" response message in the sense that it has the effect of "tarpitting" the infected device, that is, stopping, slowing down and/or restricting the transmission of the malicious network traffic by the infected device. For example, the "spoofed" response message may set the window size to zero (or a value close to zero) which will have the effect of reducing the amount of malicious network traffic. In another example, a client's SYN packet is replied to with a spoofed SYN/ACK packet. Any time the infected device attempts to transmit a packet after the TCP connection is open, a spoofed packet will be sent to the infected device with the window size set to zero or close to zero.

In one example embodiment, other remediation actions are implemented in addition to the tarpitting described above (operation 1428). For example, the infected device may be prevented from communicating with devices, such as hosts. In this case, certain whitelisted IPs/domains may be exempted and may be allowed to communicate with the infected device. Such remediation actions may also comprise, for example, discarding packets from the flagged source address, diverting traffic flow to a specified network address, performing DPI on the traffic flow, and the like. For example, the CPE 106/1210 or the central controller 1214 may send a message or other control signal to a network device of a sub-network instructing the network device to handle all traffic from a specified network address differently from the normal network traffic. Prescribed mitigation actions may be stored in a database, table, and the like. In this manner, the mitigation action performed can be tailored to the corresponding source address.

Recapitulation

Given the discussion thus far, it will be appreciated that, in general terms, an exemplary method, according to an aspect of the invention, includes the operations of receiving network traffic from a network-based device 1204 (operation 1304); analyzing the network traffic to identify the network-based device 1204 as an infected network-based device 1204 (operation 1308); and sending, in response to identifying the network-based device 1204 as an infected network-based device 1204, a response message to the infected network-based device 1204, the response message triggering a tarpitting effect on the network-based device (operation 1316).

In one example embodiment, the response message sets a Transmission Control Protocol (TCP) window size to zero. In one example embodiment, the response message is a spoofed SYN/ACK packet that replies to a SYN packet of the infected network-based device 1204 and further comprising ceasing a generation of additional response messages to the infected network-based device 1204. In one example embodiment, the response message spoofs a source Internet Protocol (IP) address of the intended destination of the network traffic. In one example embodiment, the analysis comprises inspecting a volume of network traffic sent to a specified destination under non-attack conditions to establish a baseline traffic level, and suspecting a malware attack in response to a current volume of traffic substantially exceeding the established baseline traffic level. In one example embodiment, the analysis comprises one or more of evaluating total Transmission Control Protocol (TCP) traffic, evaluating total Domain Name System (DNS) traffic, evaluating one or more protocols utilized for worm propagation, evaluating a particular pattern of traffic, evaluating prescribed threat information, evaluating a static signature, and evaluating a network traffic anomaly. In one example embodiment, the infected network-based device 1204 is prevented from communicating with other devices. In one example embodiment, one or more of packets are discarded from a flagged source address, the network traffic is rate-limited, traffic flow is diverted to a specified network address, and deep packet inspection is performed on the network traffic.

In one example embodiment, a non-transitory computer readable medium comprises computer executable instructions which when executed by a computer cause the computer to perform the method of: receiving network traffic from a network-based device 1204 (operation 1304); analyzing the network traffic to identify the network-based device 1204 as an infected network-based device 1204 (operation 1308); and sending, in response to identifying the network-based device 1204 as an infected network-based device 1204, a response message to the infected network-based device 1204, the response message triggering a tarpitting effect on the network-based device 1204 (operation 1316).

In one example embodiment, an apparatus comprises a memory; and at least one processor, coupled to said memory, and operative to perform operations comprising: receiving network traffic from a network-based device 1204 (operation 1304); analyzing the network traffic to identify the network-based device 1204 as an infected network-based device 1204 (operation 1308); and sending, in response to identifying the network-based device 1204 as an infected network-based device 1204, a response message to the infected network-based device 1204, the response message triggering a tarpitting effect on the network-based device 1204 (operation 1316).

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 13:
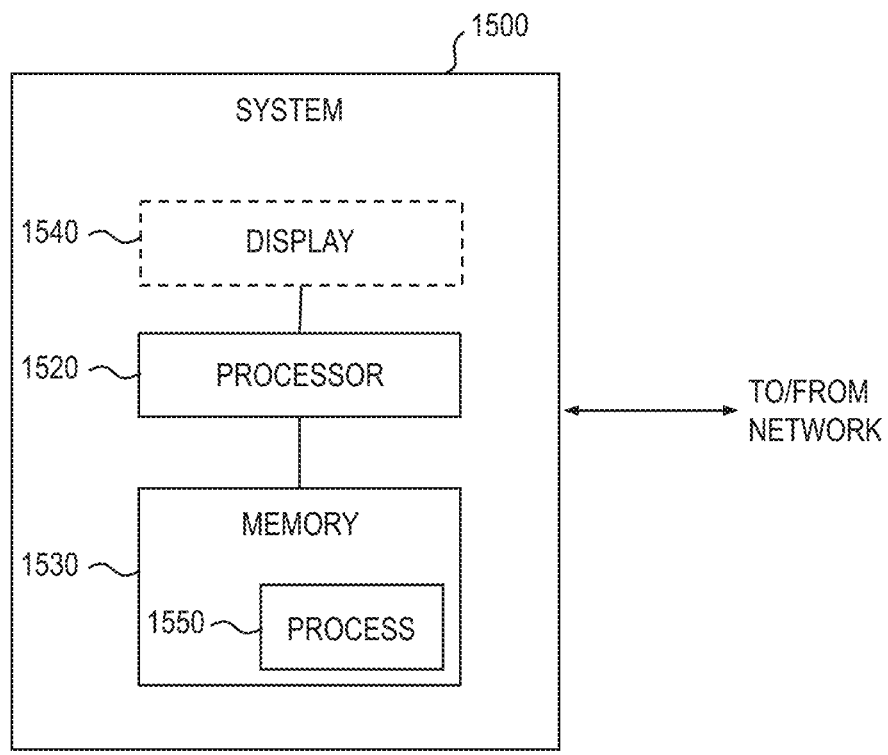
FIG. 13 is a block diagram of at least a portion of an exemplary system that can be configured to implement at least some aspects of the invention, and is representative, for example, of one or more of the apparatus or modules shown in the figures.

FIG. 13 is a block diagram of at least a portion of an exemplary system 1500 that can be configured to implement at least some aspects of the invention, and is representative, for example, of one or more of the apparatus or modules shown in the figures. As shown in FIG. 13, memory 1530 configures the processor 1520 to implement one or more methods, steps, and functions (collectively, shown as process 1550 in FIG. 13). The memory 1530 could be distributed or local and the processor 1520 could be distributed or singular. Different steps could be carried out by different processors, either concurrently (i.e., in parallel) or sequentially (i.e., in series).

The memory 1530 could be implemented as an electrical, magnetic or optical memory, or any combination of these or other types of storage devices. It should be noted that if distributed processors are employed, each distributed processor that makes up processor 1520 generally contains its own addressable memory space. It should also be noted that some or all of computer system 1500 can be incorporated into an application-specific or general-use integrated circuit. For example, one or more method steps could be implemented in hardware in an ASIC rather than using firmware. Display 1540 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   receiving network traffic from a network-based device;
   analyzing the network traffic to identify the network-based device as an infected network-based device; and
   generating a tarpitting effect by repeatedly sending, in response to identifying the infected network-based device, a response message to the infected network-based device, each response message triggering an action on the network-based device, the plurality of triggered actions constituting the tarpitting effect, wherein each response message sets a Transmission Control Protocol (TCP) window size to zero and the network-based device repeatedly temporarily ceases sending malicious network traffic in response to receiving the plurality of response messages.

2. The method of claim 1, wherein each response message is a spoofed SYN/ACK packet that replies to a SYN packet of the infected network-based device.

3. The method of claim 1, wherein each response message spoofs a source Internet Protocol (IP) address of an intended destination of the network traffic.

4. The method of claim 1, wherein the analysis comprises inspecting a volume of network traffic sent to a specified destination under non-attack conditions to establish a baseline traffic level, and suspecting a malware attack in response to a current volume of traffic substantially exceeding the established baseline traffic level.

5. The method of claim 1, wherein the analysis comprises one or more of evaluating total Transmission Control Protocol (TCP) traffic, evaluating total Domain Name System (DNS) traffic, evaluating one or more protocols utilized for worm propagation, evaluating a particular pattern of traffic, evaluating prescribed threat information, evaluating a static signature, and evaluating a network traffic anomaly.

6. The method of claim 1, further comprising preventing the infected network-based device from communicating with other devices.

7. The method of claim 1, further comprising one or more of discarding packets from a flagged source address, rate-limiting the network traffic, diverting traffic flow to a specified network address, and performing deep packet inspection on the network traffic.

8. A non-transitory computer readable medium comprising computer executable instructions which when executed by a computer cause the computer to perform the method of:
   receiving network traffic from a network-based device;
   analyzing the network traffic to identify the network-based device as an infected network-based device; and
   generating a tarpitting effect by repeatedly sending, in response to identifying the network-based device as an infected network-based device, a response message to the infected network-based device, each response message triggering an action on the network-based device, the plurality of triggered actions constituting the tarpitting effect, wherein each response message sets a Transmission Control Protocol (TCP) window size to zero and the network-based device repeatedly temporarily ceases sending malicious network traffic in response to receiving the plurality of response messages.

9. The non-transitory computer readable medium of claim 8, wherein each response message is a spoofed SYN/ACK packet that replies to a SYN packet of the infected network-based device.

10. The non-transitory computer readable medium of claim 8, wherein each response message spoofs a source Internet Protocol (IP) address of an intended destination of the network traffic.

11. An apparatus comprising:
a memory; and
at least one processor, coupled to said memory, and operative to perform operations comprising:
receiving network traffic from a network-based device;
analyzing the network traffic to identify the network-based device as an infected network-based device; and
generating a tarpitting effect by repeatedly sending, in response to identifying the network-based device as an infected network-based device, a response message to the infected network-based device, each response message triggering an action on the network-based device, the plurality of triggered actions constituting the tarpitting effect, wherein each response message sets a Transmission Control Protocol (TCP) window size to zero and the network-based device repeatedly temporarily ceases sending malicious network traffic in response to receiving the plurality of response messages.

12. The apparatus of claim 11, wherein each response message is a spoofed SYN/ACK packet that replies to a SYN packet of the infected network-based device.

13. The apparatus of claim 11, wherein each response message spoofs a source Internet Protocol (IP) address of an intended destination of the network traffic.

14. The apparatus of claim 11, wherein the analysis comprises inspecting a volume of network traffic sent to a specified destination under non-attack conditions to establish a baseline traffic level, and suspecting a malware attack in response to a current volume of traffic substantially exceeding the established baseline traffic level.

15. The apparatus of claim 11, wherein the analysis comprises one or more of evaluating total Transmission Control Protocol (TCP) traffic, evaluating total Domain Name System (DNS) traffic, evaluating one or more protocols utilized for worm propagation, evaluating a particular pattern of traffic, evaluating prescribed threat information, evaluating a static signature, and evaluating a network traffic anomaly.

16. The apparatus of claim 11, the operations further comprising preventing the infected network-based device from communicating with other devices.

17. The apparatus of claim 11, the operations further comprising one or more of discarding packets from a flagged source address, rate-limiting the network traffic, diverting traffic flow to a specified network address, and performing deep packet inspection on the network traffic.

\* \* \* \* \*